March 6, 1928.  1,662,004
R. E. JENKINSON
BEAD SETTING MECHANISM
Filed May 28, 1925
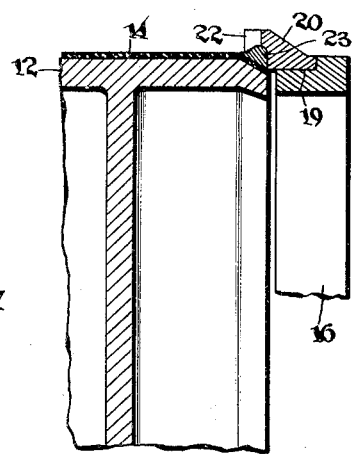
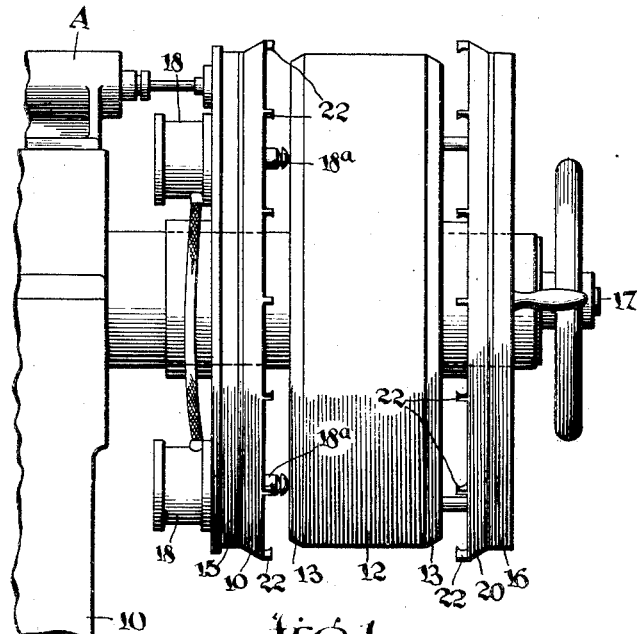
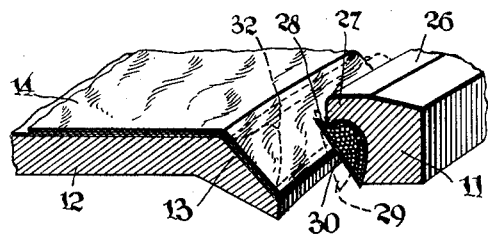
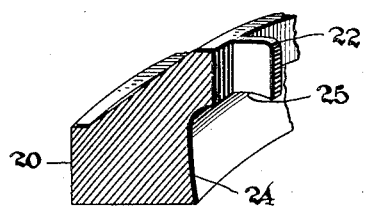
INVENTOR
Ross E. Jenkinson,
BY
ATTORNEY Patented Mar. 6, 1928.

1,662,004

UNITED STATES PATENT OFFICE.

ROSS E. JENKINSON, OF AKRON, OHIO, ASSIGNOR TO THE GOODYEAR TIRE & RUBBER COMPANY, OF AKRON, OHIO, A CORPORATION OF OHIO.

BEAD-SETTING MECHANISM.

Application filed May 28, 1925. Serial No. 33,453.

My invention relates to improvements in tire building machines and it has particular relation to the provision of a bead-setting device utilized in such machines.

One object of my invention is to provide an improved bead-setting device which will hold the bead, preliminary to application thereof to a tire carcass, in a position adjacent the carcass and at the same time will permit the bead to freely assume the correct position on the tire carcass when the ring is moved toward the tire.

Another object of my invention is to provide a bead-setting ring so constructed that it will prevent the bead from sticking to the ring after pressure has been applied to position it upon the tire carcass.

Another object of my invention is to provide a bead-setting ring which is relatively inexpensive, simple of operation, and especially adapted to be employed in connection with the manufacture of flat-built tires.

In the manufacture of flat-built tires, which consists generally in superimposing several plies of rubberized fabric material upon a cylindrical drum having beveled edges, considerable difficulty has been encountered in devising a suitable mechanical apparatus for setting the beads upon the carcass of a tire during the course of manufacture. Heretofore, beads have been applied to this type of tire by hand and have been pressed into close contact with the carcass by means of hand tools. This operation obviously was laborious and time-consuming, as well as presenting the inevitable difficulties incident to producing uniform finished articles by hand. The main problem which presented itself was the production of a bead-setting ring which would maintain the bead thereon until is was mechanically pressed against the tire carcass in the position desired without danger of the bead sticking to the ring when the ring was withdrawn. I have constructed a bead setting ring which will, without difficulty, slip over the circumference of the bead and which also has the characteristics of so pressing the bead against the tire carcass that it will remain firmly in place when the ring is withdrawn.

For a more thorough understanding of my invention, reference may now be had to the accompanying drawing forming a part of this specification, of which:

Fig. 1 is a fragmentary view of a tire building machine illustrating a device embodying the principles of my invention incorporated therein;

Fig. 2 is a fragmentary sectional view, on a larger scale, of a bead-setting ring showing its relation to a part of the tire building drum;

Fig. 3 is a detail view illustrating a portion of the structure of my bead-setting ring; and Fig. 4 is also a detail view illustrating a modification of my invention.

In practicing my invention, I have constructed a device adapted to be applied to a conventional tire building machine 10, the construction and operation of which is well-known and a detailed description thereof is not necessary for a thorough understanding of my invention. In general, the tire building machine consists of a rotatable drum or support 12, having beveled edges 13, which is adapted for utilization in the construction of a flat-built tire represented at 14. At the sides of the drum are two oppositely disposed annular ring supports 15 and 16 which are adapted to be reciprocated in a horizontal direction toward and away from the drum upon a shaft 17. A fluid pressure operated mechanism A is employed for advancing and retracting the inner bead-setting device 15 toward and away from the drum. The outer bead-setting ring 16 is positioned manually. A plurality of interconnected fluid pressure operated devices 18 effect a clamping of the bead-rings 15 and 16 together against the drum by actuation of plungers 18ª which interlock with suitable hooks on the ring 16.

A section of the ring support 16 is cut away, as indicated at 19, to provide a seat for a bead setting ring 20. Both of the ring supports are provided with identical seating portions and for this reason, description of one will suffice to explain the structure.

In constructing the annular bead-setting ring 20, I have provided a plurality of lugs or projections 22 spaced sufficiently to allow an annular bead 23 to be supported in encircling relationship thereon and to bend between the lugs toward and away from its annular center. Any convenient number of these lugs may be provided. However, I have found it satisfactory to provide 12 or 14 of them, evenly spaced about the circumference of the ring and projecting substantially at right-angles therefrom. Each of the lugs 22 projects from a surface 24 of the ring and is provided with a slightly curved under-cut portion 25 upon which the outer periphery of the bead is adapted to rest.

It will be noted by reference to Fig. 3 that the ring is formed with the surface 24 corresponding to the shape of the engaging surface of the tire bead and that this surface merges into the curved under-cut portion of the lug. Thus, when the bead 23 is placed upon the ring and pressed toward the beveled portions 13 of the drum, it will assume the position indicated in Fig. 2. The lugs function to maintain the bead upon the bead-setting ring until the bead is pressed into position on the carcass. But the lugs will slip over the bead and avoid pulling it from the carcass after fluid pressure is relieved and the bead-setting rings are moved back to the position shown in Fig. 1. Uniform fitting of the bead upon the carcass of the tire is insured because the pressure surface 24 corresponds to the shape of the bead and tends to maintain its normal contour. If there should be any slight irregularity in the bead or shape of the tire along the area of application of the bead thereto, the spaced lugs will permit sufficient play to accommodate this irregularity and avoid buckling of the bead at all points about its circumference.

As shown in Fig. 4 of the drawings illustrating another form which my invention may assume, an annular ring 26 may be provided somewhat similar to the ring 20 with the exception that the lugs are omitted and replaced by a flange 27 extending circumferentially around the ring and projecting substantially at right angles to the plane of the ring. In this form of my invention, the inner circumference of the ring flange is slightly less than the outer circumference of the bead, as indicated at 28. This manner of construction permits the bead to be slightly distorted in order to assume substantially the position indicated by the dot and dash lines 29 and in order that it may be held in place upon the ring until the carcass built on the drum is ready to receive it. After pressure is exerted upon the bead against the portion of the carcass covering the beveled edges 13, by admitting fluid into the cylinders 18, the bead is brought into the position indicated in the full lines 30 and upon the application of further pressure against the carcass of the tire it sticks thereto in the position indicated in dot and dash lines 32, after the ring is moved back to normal position. It will be seen from this construction that the pressure area of the ring is such that the bead is correctly positioned about the tire casing and there is no danger of the bead being caught by part of the ring and pulled away from the drum after pressure has been applied.

Although I have illustrated but the preferred forms which my invention may assume, it will be apparent to those skilled in the art that it is not so limited but that various minor modifications and changes may be made therein without departing from the spirit of my invention or from the scope of the appended claims.

What I claim is:

1. A device for setting a bead upon a tire carcass comprising an annular member formed with a plurality of spaced elements projecting laterally, each element being provided with an undercut curved surface adapted to engage the outer periphery of a tire bead for holding the bead in place upon the annular member.

2. A device for setting a bead upon a tire carcass comprising an annular member provided with a curved bead engaging surface of approximately the same width as the width of the bead, spaced projections on the annular member overhanging the curved surface, said surface and projection being adapted to be pressed against the bead to properly position it upon the tire carcass when the annular member is moved toward the tire carcass.

3. A device for setting a bead upon a tire carcass comprising an annular member formed with a substantially radially extending curved surface corresponding to the surface of the tire bead adapted to be placed against the bead to seat it upon the carcass, and spaced projections formed with curved edges adjoining the curved surface of the annular member, the curved surface and the curved edges constituting a continuous surface corresponding substantially to the contour of the portion of the bead engaged thereby.

4. A bead-setting device comprising an annular metal member having a curved surface adapted to engage a portion of the bead, and a projection overhanging the curved surface and disposed substantially at right-angles to the plane of the ring, the projection being adapted to engage the outer periphery of the bead.

5. The combination with a tire building machine having a flat drum provided with beveled edges, of a bead-setting mechanism comprising a plurality of bead rings having spaced over-hanging projections adapted to engage the outer periphery of the beads and means for simultaneously pressing the rings against the beveled edges of the drum.

6. The combination with a tire building machine having a flat drum provided with beveled edges, of a bead setting mechanism comprising a plurality of bead rings each provided with a concave surface, said surface extending radially and then laterally with respect to the plane of the ring, the laterally disposed portion of the surface being adapted to engage the outer circumferential surface of the bead, and means for simultaneously pressing the rings against the beveled edges of the drum.

7. A machine for fabricating flat built tires, comprising a rotatable cylindrical drum having beveled edges, the outwardly beveled edges being adapted to mate with internally beveled tire beads, means contacting solely with the exterior surface of the beads for supporting, centering and pressing them against the edges of the drum, and additional means for actuating said bead supporting and centering means.

8. A machine for fabricating flat built tires comprising a cylindrical drum having outwardly beveled edges adapted to mate with the inner peripheries of tire beads, means for supporting and centering and pressing the beads against the edges of the drum, said means including an annular member having one edge undercut so as to receive and support the bead solely by its exterior surface, and additional means for actuating the tire centering means.

9. A tire machine comprising a cylindrical drum having beveled edges adapted to mate with the outwardly beveled inner peripheral surfaces of tire beads, an annular member having an undercut inner peripheral surface adapted to receive and support the beads solely by their exterior surface and pneumatic means for actuating the bead supporting means to cause the beads to contact and adhere to the beveled surfaces and to the drum.

In witness whereof, I have hereunto signed my name.

ROSS E. JENKINSON.